INVENTOR.
WOLFGANG HARRIES
LEONARD KEDSON

INVENTORS
WOLFGANG HARRIES
LEONARD KEDSON 3,251,051
Patented May 10, 1966

3,251,051

SERIAL BINARY TRANSMITTER OF DATA-MODULATED REFERENCE POTENTIAL CROSSING SIGNALS

Wolfgang Harries, Hazlet, and Leonard Kedson, Elberon, N.J., assignors to Electronics Associates Inc., Long Branch, N.J., a corporation of New Jersey Filed July 10, 1963, Ser. No. 293,989
3 Claims. (Cl. 340—345)

The present invention relates to data transmission systems, and is concerned particularly with the transmission of binary-coded data.

In Patent No. 3,032,745, issued May 2, 1962, to Howard Hamer and assigned to the assignee hereof, a system is disclosed wherein data is transmitted in the form of phase-modulated sine waves. In the transmitted signal as described in the Hamer patent, an individual sine wave that has an unchanged phase relationship to the preceding sine wave represents binary "zero," whereas a 180-degree phase reversal between one sine wave and the next signifies binary "one." The Hamer system has many advantages over previous systems for transmitting bits of binary data in serial fashion. For example, it has a high degree of inherent immunity to noise and it avoids much complexity that characterized circuits previously employed.

A broad object of the present invention resides in providing a novel improved transmitter for serial binary data transmission. In its broad concept, this invention is based upon the realization that the advantages of the Hamer system can be retained, and yet binary-coded information can be transmitted as modulated rectangular shaped waveforms or square-waves in place of sine waves and reversed-phase sine waves, as described in the Hamer patent. The successive portions of the transmitted rectangular or square-wave signals do not directly represent the data in the sense of low potential levels always representing binary "zero" (for example) and subsequent high potential levels representing binary "one." The transmission is a modulated signal whose level at any particular instant has no meaning in terms of binary data value. At the start of each clock interval, the modulated signal potential crosses a reference potential and at the end of each clock interval the modulated signal potential again crosses the reference potential. During the clock interval if the modulated signal potential additionally crosses the reference potential then a first state bit is defined while the absence of such an additional crossing during the clock interval defines a second state bit. It will be understood that a first state bit may correspond to a "one" bit and a second state bit may correspond to a "zero" bit or vice versa. In the specific example described below, zero potential will be used as the reference potential and a zero potential crossing during a clock interval represents a "one" bit or a binary "one," and the absence of such zero potential crossing during a clock interval represents a "zero" bit or a binary "zero."

For economical data transmission, each clock interval should be as short as practicable. It might be a matter of some concern that the modulated rectangular or square-wave transmission tends to become distorted in transmission because of the prominent sharp corners that are characteristic of such waves. These represent much higher frequency components than a pure sine-wave transmission of clock frequency. It is pointed out, however, that loss of high frequency signal components of the rectangular or square waves in the course of transmission is not serious because it is the sequence of zero-crossings in the signal which represent the clock and the data significance of the signal. Further, because of the assured reversal of polarity of the modulated transmission at least once each clock interval, there is no danger of transformers present in usual telephone transmission circuits becoming saturated or polarized, and consequently the modulated square-wave signal here involved is well suited to transmission over lines that include transformers. It follows that a zero-crossing signal of the type involved in the present invention is well adapted to data transmission in a system that retains the important advantages of the Hamer patent.

The train of phase-modulated sine waves as described in Hamer would also be of relatively high frequency in practice and would be distorted in the course of transmission by a line such as a pair of telephone wires. In addition, the phase reversals in Hamer introduce substantial high-frequency signal content and the present modulated square-wave signal is more suitable for demodulation than the Hamer form of transmitted signal. Consequently, data transmission by the herein disclosed data-modulated waves can well replace the Hamer phase-modulated sine-wave signals.

A further object of this invention resides in the provision of a novel transmitter that produces data-modulated zero-crossing signals, the novel transmitter utilizing basic switching, gating and related computer-type constituent circuits throughout. As will be seen, a data modulator for this purpose can have high reliability and still be of remarkably simple form that is not merely economical but also remarkably free of complexity and problems that characterize known data-modulated signal transmitters.

In accordance with the present invention, there is provided clock pulse source means for providing a sequence of clock pulses. The input binary information is applied to means for providing a data pulse between successive clock pulses to correspond to a first state bit and for not providing a data pulse between successive clock pulses to correspond to a second state bit. The outputs of the clock means and of the data pulse means are applied to bistable means which switches from one to the other of its stable states upon application thereto of each one of the clock pulses and of the data pulses. In this manner, the bistable means is switched from a first stable state for producing a first potential to a second stable state for producing a second potential with a reference potential being intermediate of the first and second potentials. Thus, the data-modulated signal, taken from the output of the bistable means, provides an output signal corresponding to a first state bit when the output signal potential crosses the reference potential between two successive clock pulses and provides an output signal corresponding to a second state bit when there is an absence of a crossing of the reference potential between two successive clock pulses.

The data modulator described below by way of illustrative example includes a flip-flop or single binary counting stage that has a "clock" output terminal and a "data" output terminal. This flip-flop is switched through back-and-forth cycles at clock intervals. The "clock" output terminal provides signals which are converted into clock pulses. The "data" output terminal of this flip-flop is connected to an "and" gate on which there is also impressed a sequential series of data bits, including information bits and error-coding bits. The "and" gate provides an output pulse when a data signal is impressed on an input point of this gate at the same time that the "data" output point of the flip-flop tends to turn this gate "on," at or near the middle of the clock interval. These data pulses from this gate and the clock pulses mentioned previously are used to produce a square-wave signal that characteristically involves a sharp polarity reversal at least once each clock interval and, during binary "one" data clock intervals there is an additional polarity reversal. The zero-crossing part of the signal at the beginning of each clock interval provides the transmitted signal itself with a basis for deriving clock pulses at the receiver and thus obviates the necessity of any synchronized clock-pulse generator at the receiver. All the advantages of the Hamer transmission are realized, without requiring circuits for providing and for switching sine waves, and for amplifying sine waves having abrupt phase reversals.

The nature of the invention and its further features, advantages and objects will be recognized in the following detailed description of an embodiment of the invention which is shown by way of example in the accompanying drawings.

Figure 1:
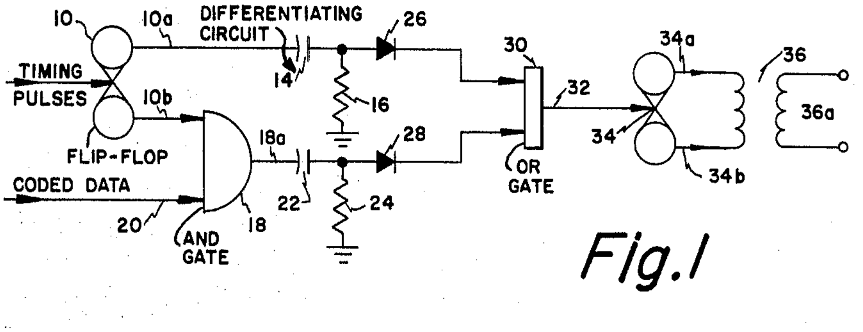
FIGURE 1 is a wiring diagram of a novel data modulator, incorporating certain logic symbols representing standard switching and gating circuits.

Referring now to FIGURE 1, a flip-flop or bistable unit 10 is shown having an input connection 12 to which a series of timing pulses are supplied from a source of such pulses. Output line 10*a* is connected to a differentiating circuit including capacitor 14 and resistor 16. Output terminal 10*b* of the flip-flop is connected to one input point of an "and" gate 18. Coded data bits are supplied on line 20 to another input terminal of gate 18. Coded data bits are supplied on line 20 to another input terminal of gate 18. The output of gate 18 is connected to another differentiating circuit including capacitor 22 and resistor 24. Rectifiers 26 and 28 are connected between the differentiating circuits and "or" gate 30. These rectifiers pass voltage spikes of one polarity and suppress voltage spikes of the opposite polarity produced by the differentiating circuits. The transmitted spikes are combined in "or" gate 30 and transmitted by line 32 to another flip-flop 34. In response to each input pulse on line 32, stage 34 produces signals of successively reversed relative polarity at lines 34*a* and 34*b* for transmission as by a telephone line through an isolating transformer 36 that has grounded centertaps.

Figure 2:
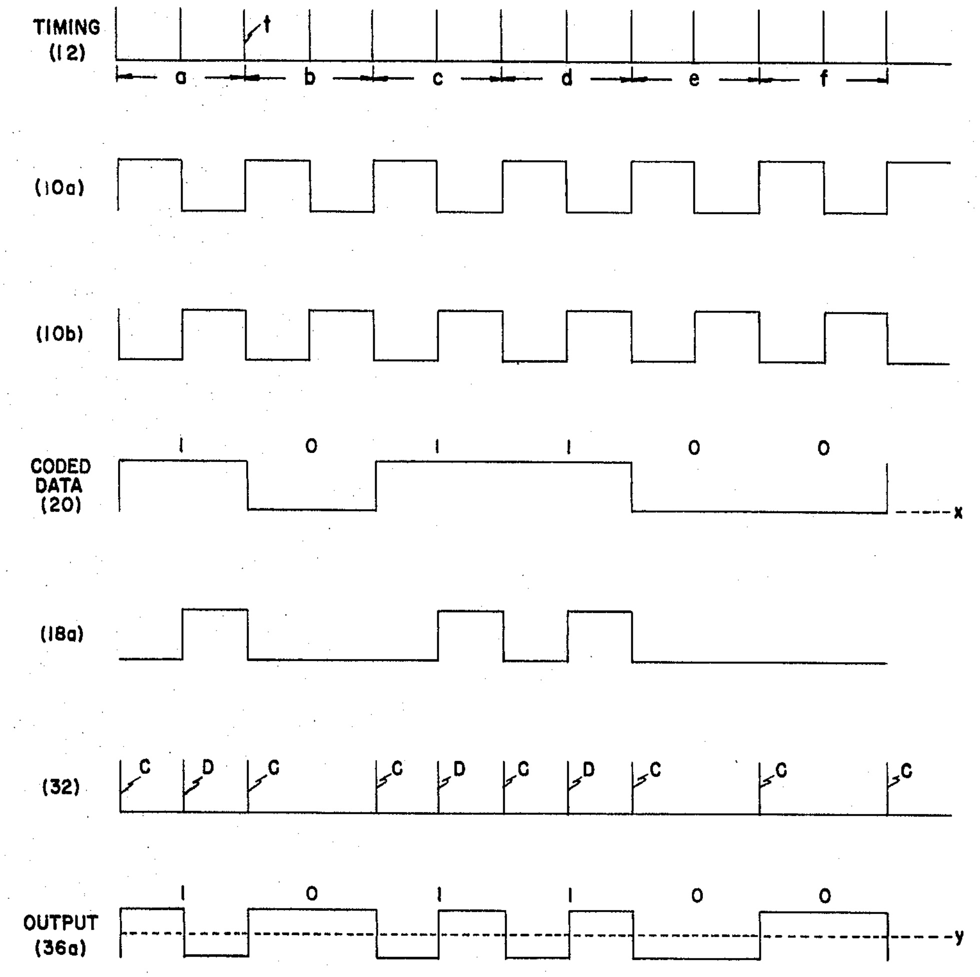
FIGURE 2 represents the waveforms found at different parts of the circuit of FIGURE 1.

The operation of the data modulator of FIGURE 1 is illustrated by the various signals illustrated in FIGURE 2. A succession of timing pulses *t* on input line 12 occur at a frequency that provides clock intervals *a*, *b*, . . . *f*. Flip-flop 10 has two output points 10*a* and 10*b* that are alternately "on" and "off," and these provide complementary square-waves as represented at (10*a*) and (10*b*) in FIGURE 2. It will be understood that the coded data as it is supplied to line 20 of FIGURE 1 may be utilized in many differing forms as for example as designated (20) in FIGURE 2. In waveform 20 a binary "one" is represented by a high-level part of the wave above the reference level *x* and is sustained throughout the entire clock interval. Thus, the signal (18*a*) appearing at the output terminal 18*a* of gate 18 has a sharp rise at the center of each clock interval in which binary "one" is to be represented.

The succession of pulses (32) in FIGURE 2 includes a clock pulse C for each rising front of the wave 10*a*. In addition, data pulses D appear at the rising fronts of wave 18*a*, in clock intervals involving binary "one" data. Each of these pulses C and D causes flip-flop 34 to reverse once, with the result that the output signal (36*a*) involves a change of polarity or a reversal in response to each pulse on line 32. This output may be considered as changing back-and-forth across a reference line *y*, which may be the transmission-line ground. Output signal (36*a*) involves a "zero-crossing" portion for each clock pulse and an additional "zero-crossing" for each data pulse that appears on line 32. The data is represented by the significant zero-crossings that must occur, if at all, between two successive clock pulses C.

The precise timing of any one zero-crossing may be permitted to vary to some limited extent, and the sharpness of the square-wave may be subjected to such distortion during transmission as to be virtually lost, without losing the significant portions of the signal represented by the zero-crossings. Further, because the signal does not include any long sustained portions (such as is represented at clock intervals *c* and *d*, for example, in signal (20) of FIGURE 2), the modulated signal (36*a*) is well adapted for transmission by a transformer and by telephone lines that may include any number of transformers. The reversal of polarity in such a signal which occurs at least once during each clock interval and more often when binary "one" bits are transmitted, means that transformers will not be polarized and can well handle the modulated signal that is produced.

Throughout the modulator, the only circuits that are needed are those which are commonly found in computers such as gates, flip-flops, and differentiating circuits. These are circuits of high reliability and of very simple and inexpensive design. As a result, the entire circuit of FIGURE 1 that produces the data-modulated signal described above is remarkably economical and highly reliable. It does not depend upon such circuits as amplifiers that must preserve the proportional values or precise timing or duration of various signals. Further, in common with the type of signal produced in the transmitter of the Hamer patent mentioned above, the output signal here involved is one that contains both information and timing components in the form of zero-crossings and is remarkably immune to the effects of distortion such as might be expected in transmission lines. This is of particular concern where the clock interval is to be made as short as feasible in attaining a high rate of data transmission. Under such circumstances, the squareness of each portion of the square-wave signal may well be lost, with little consequence to the zero-crossing signal here involved.

Figure 3:
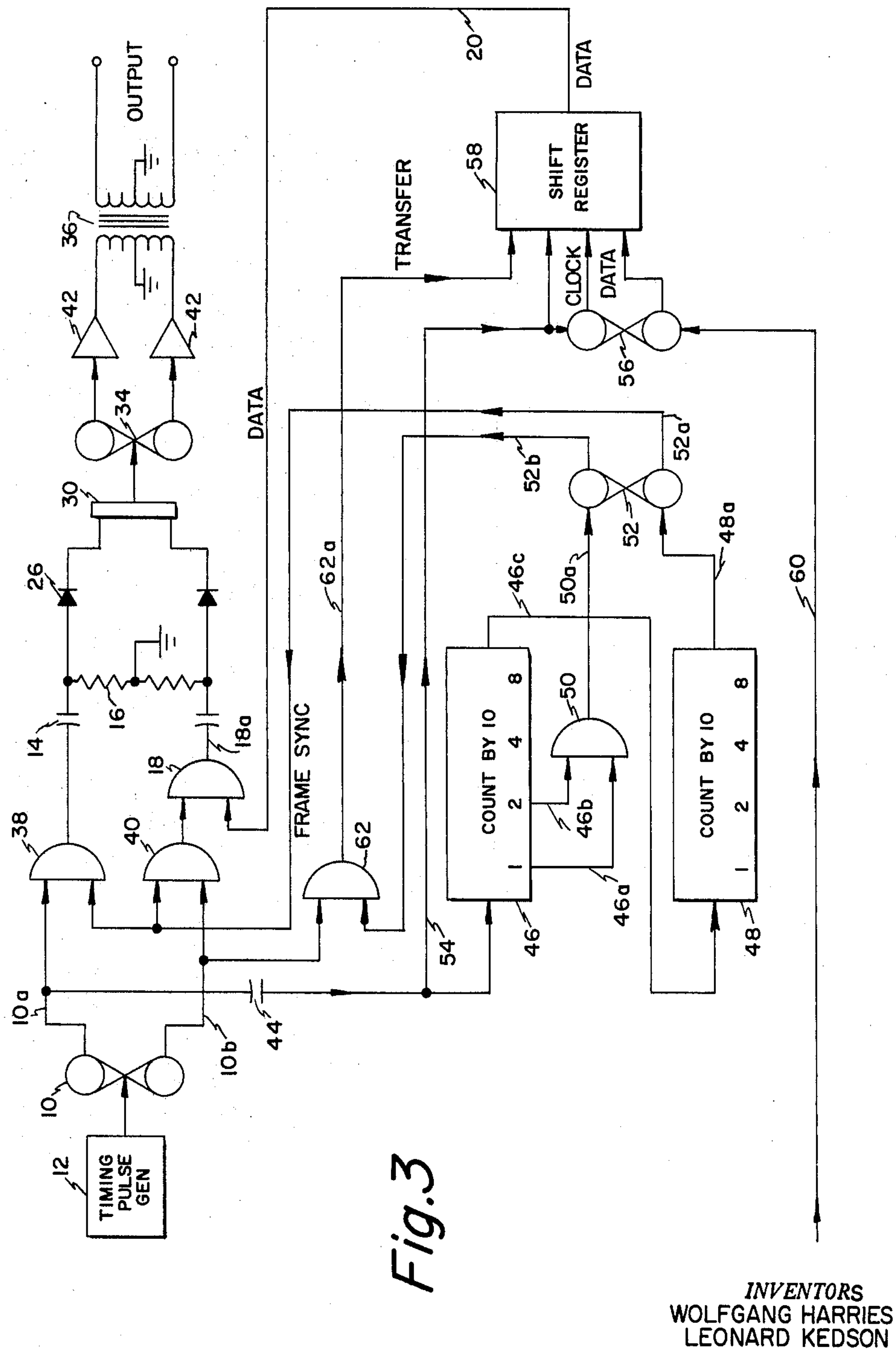
FIGURE 3 represents a diagram similar to FIGURE 1 of a more complete transmitter incorporating the modulator circuit of FIGURE 1.

The data modulator of FIGURE 1 is naturally subject to varied modifications. For example, a practical data transmitter is illustrated in FIGURE 3. In this figure, the same reference numerals are used as in FIGURE 1 to designate corresponding parts. For brevity, their description and operation are not repeated here. In the adaptation of FIGURE 3, "and" gate 38 is interposed between output line 10*a* of flip-flop 10 and the differentiating circuit 14, 16, and another "and" gate 40 is interposed between flip-flop output terminal 10*b* and one input terminal of gate 18. Further, isolating and impedance-changing emitter-follower stages 42 are interposed between flip-flop 34 and output transformer 36 in FIGURE 3.

The rising-front portions of the signal on output line 10*a* are coupled by capacitor 44 to a scale-of-ten counter 46 having three output points 46*a*, 46*b*, and 46*c*. This is of a well-known design as for example, as described in "Pulse and Digital Circuits" by Millman and Taub, McGraw-Hill, 1956, at page 327 et seq. Thus, counter 46 need not be described in detail, but it will be recognized that output terminals 46*a* and 46*b* will both be "on" when the first and second stages of the counter reach the count of three. When a count of ten is reached, an output signal appears on line 46 that provides input to the scale-of-ten counter 48.

"And" gate 50 has an output terminal 50*a* providing one input connection to flip-flop 52. Counter 48 has another separate connection 48*a* to flip-flop 52. The arrangement of counters 46 and 48, gate 50 and flip-flop 52 is to produce a blocking signal on line 52*a* at the output of flip-flop 52 until a count of "three" is reached. At this time, flip-flop 52 has its state reversed, and the blocking condition on line 52*a* disappears. Pulses continue at the input of counter 46 and a succession of pulses is supplied to counter 48 each time counts of 10 are reached in counter 46. However, because the state of flip-flop 52 has been reversed by the first count of "three," this flip-flop is no longer responsive to succeeding impulses on line 50*a*. In due course, when a count of 100 is reached, the output on line 48*a* reverses flip-flop 52. The blanking condition of line 52*a* is restored. Flip-flop 52 is again in condition for response to a count-of-three impulse appearing on its input line 50*a*. The effect of line 52*a* is to turn off "and" gate 38 and 40 during three clock intervals out of 100, as a frame marker in the transmission.

"Clock" pulses passed by capacitor 44 are coupled by a line 54 to flip-flop 56 and to the data shift register unit 58. Shift registers are well-known in the art and are described for example in the above-cited text "Pulse and Digital Circuits" at page 411 et seq. Digital data is supplied to register 58 by connection 60 that extends to a source of such information. The information is fed into register unit 58 as timed by flip-flop 56 under control of pulses on line 54. Similarly, timing pulses on line 54 control the rate and timing of serial readout of data from the register 58. The output line 20 of unit 58 provides the data input to gate 18.

Flip-flop 52 has a second output line 52*b* that extends to an "and" gate 62. Line 52*b* is properly energized to cause "and" gate 62 to emit a transfer pulse at the end of a 100-count frame. This is transmitted by line 62*a* for causing parallel transfer of the data from one shift register to another in unit 58, the transferred data then becoming available for data readout via line 20.

The modulators of FIGURES 1 and 3 include many features in common. FIGURE 3 includes certain portions that provide frame synchronizing and the supply of data, but both modulators demonstrate the notable simplicity that can be attained in providing a data modulated signal through the novel concepts involved. The form of modulator shown is naturally susceptible of varied execution by those skilled in the art. For example, parity coding may be added to the system of FIGURE 3 by connecting an addition shift register to the data shift register 58 to block register 58 in accordance with the desired parity code. In addition, it will also be understood that counts other than 3, 10, and 100 may be utilized. Accordingly, the invention should be broadly construed in accordance with the spirit and scope of the invention.

What is claimed is:

1. A data-modulated signal generator, comprising
a timing pulse generator having a period of one-half the clock interval of the desired signal,
a first bistable circuit connected to said timing pulse generator and having first and second oppositely phased square-wave output terminals, a second bistable circuit,
first means for converting the square-wave output at said first output terminal into a train of clock pulses, a source of binary data signals,
an "and" gate having respective input connections to said source of binary-data signals and to said second output terminal,
second means for converting the output of said "and" gate to a sequence of data pulses within said clock intervals, said data pulses occurring during only certain of said clock intervals in dependence upon said binary-data signals, and
OR gate means connected to said first and second converting means for impressing said clock pulses and said data pulses on said second bistable circuit and whereby an output signal is available from said second bistable circuit including one reversal that occurs once each clock interval and including an additional reversal during each clock interval in which a data pulse appeared.

2. The generator of claim 1 in which said first bistable circuit comprises a first flip-flop circuit and in which said timing pulse generator is connected to a trigger input of said first flip-flop circuit.

3. The generator of claim 1 in which said second bistable circuit comprises a second flip-flop circuit and in which an output of said OR gate means is connected to a trigger input of said second flip-flop circuit.

References Cited by the Examiner

UNITED STATES PATENTS

| | | | |
|---|---|---|---|
| 3,088,099 | 4/1963 | Vall | 340—345 |
| 3,097,340 | 7/1963 | Dobbie | 328—61 |
| 3,133,280 | 5/1964 | Crater | 328—109 |

NEIL C. READ, *Primary Examiner.*

THOMAS B. HABECKER, *Examiner.*